United States Patent Office 3,320,250
Patented May 16, 1967

3,320,250
1,2,3,4,11,11a-HEXAHYDROPYRAZINO[1,2-b][1,2,4]
BENZOTHIADIAZINE 6,6-DIOXIDES
Peter H. L. Wei, Upper Darby, and Stanley C. Bell, Philadelphia, Pa., assignors to American Home Products Corporation, New York, N.Y., a corporation of Delaware
No Drawing. Filed Mar. 14, 1966, Ser. No. 533,876
2 Claims. (Cl. 260—243)

This invention relates to sulfur and nitrogen containing tricyclic compounds as well as to the novel method for their preparation. In particular, the present invention is concerned with hexahydropyrazinobenzothiadiazine dioxides having pharmacodynamic activity.

The novel compounds which are included within the scope of this invention are represented by the following formula:

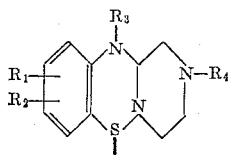

wherein $R_1$ and $R_2$ are both selected from the group consisting of hydrogen, sulfamoyl, halogen and lower alkyl; $R_3$ and $R_4$ are both selected from the group consisting of hydrogen, lower alkyl, phenyl, lower alkylphenyl, halophenyl, phen(lower)alkyl, and di(lower)alkylamino-(lower)alkyl and the pharmaceutically acceptable acid addition salts thereof. Specific examples of such compounds include:

9-chloro-1,2,3,4,11,11a-hexahydro-2,8-dimethylpyrazino-[1,2-b][1,2,4]benzothiadiazine 6,6-dioxide;
9-chloro-1,2,3,4,11,11a-hexahydro-2,8-dimethylpyrazino-[1,2-b][1,2,4]benzothiadiazine 6,6-dioxide hydrochloride; and
2,11-dibenzyl-9-chloro-1,2,3,4,11,11a-hexahydro-8-methylpyrazino[1,2-b][1,2,4]benzothiadiazine 6,6-dioxide.

The novel compounds of the present invention are prepared by the process aspects of the present invention, generally illustrated by the following equation:

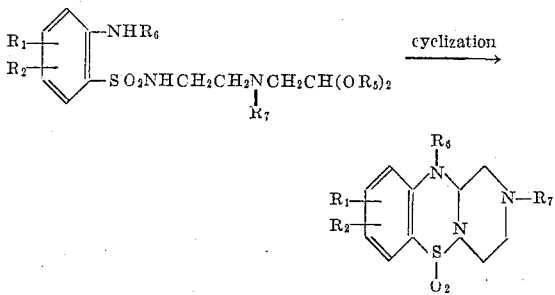

wherein $R_1$ and $R_2$ are defined as above, $R_6$ and $R_7$ are both selected from the group consisting of hydrogen, lower alkyl, phenyl, lower alkylphenyl and halophenyl; and $R_5$ is lower alkyl.

In practising the process outlined above, the compounds of this invention are prepared by heating a substantially equimolar mixture of an appropriate 6-amino-N-(2-[(2-dialkoxyethyl)amino]ethyl)benzenesulfonamide with a mineral acid in a reaction-inert solvent at a temperature from about 50° C. to about 100° C. for a period of from about one-half to about five hours. Preferably, this reaction is conducted in water or aqueous ethanol with hydrochloric acid, at steam bath temperatures for a period of about one and one-half hours.

These time and temperature ranges are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. By reaction-inert solvent is meant a solvent which dissolves the reactants and does not prevent their interaction, such as, water, an alkanol e.g. ethanol, or mixtures thereof. The term "mineral acid," as employed above, includes all inorganic acids and is exemplified by the following: hydrochloric, hydrobromic, hydroiodic, nitric, sulfuric and phosphoric acids.

After the reaction period, the mixture is cooled, extracted with a water immiscible solvent and neutralized by the addition of a base (e.g. alkali metal hydroxides and bicarbonates). Thereafter, the product is separated by filtration and purified by recrystallization from a suitable solvent, such as an alkanol.

The 2,11-phen(lower)alkyl hexahydropyrazinobenzothiadiazine dioxides and the 2,11-di(lower)alkylamino-(lower)alkyl hexahydropyrazinobenzothiadiazine compounds of the present invention are prepared by the alkylation of the corresponding above prepared 2,11-unsubstituted hexahydropyrazinobenzothiadiazine dioxides. Such procedures are well known to those skilled in the art and the general procedure is described in "Organic Chemistry" by Fieser and Fieser, third edition, page 228. The 6-amino-N-(2-[(2-dialkoxyethyl)amino]ethyl)benzenesulfonamide starting compounds are prepared in accordance with the procedure described in copending and cofiled U.S. patent application, "6-Amino-N-(2 - [(2 - Dialkoxyalkyl)Amino]Ethyl)-Benzenesulfonamides," Ser. No. 533,856, by Peter H. L. Wei and Stanley C. Bell, filed on Mar. 14, 1966.

Since the nitrogen containing compounds of the present invention are basic, advantage may be taken of the water solubility of salts of these compounds formed with acids in the isolation and/or purification of the above compounds for oral or parenteral administration. Of course, only salts formed with pharmaceutically-acceptable acids should be employed in therapeutic applications. Particularly effective salts are those formed with pharmaceutically-acceptable acids having a pH value of 3 or lower. Such acids are well-known in the art, for example, hydrochloric, hydrobromic, hydroiodic, sulfuric, nitric, phosphoric, acetic, lactic, citric, tartaric, maleic, gluconic, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

In accord with the present invention the aforementioned hexahydropyrazinobenzothiadiazine dioxides have been found to possess interesting pharmaceutical properties which render them useful as synthetic medicinals. More particularly, these compounds, in standard pharmacological tests have exhibited utility as central nervous system depressants and analgesics.

When the compounds of this invention are employed as central nervous system depressants and analgesics, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 100 mg. per day, although as aforementioned variations will occur. However, a dosage level that is in the range of from about 25 mg., to about 75 mg. per day is most desirably employed in order to achieve effective results.

The following examples are given by way of illustration and are not to be construed as limitations of this invention, many variations of which are possible without departing from the scope and spirit thereof.

Example I 6-amino - 4-chloro - N-(2-[(2-diethoxyethyl)-methylamino]ethyl)-m-toluenesulfonamide (10 g.) is suspended in water, acidified with hydrochloric acid, then heated on a steam bath for one and a half hours and cooled. The reaction mixture is then extracted with benzene, treated with Darco and then neutralized with a sodium bicarbonate solution. The resulting solid is collected and dried at room temperature to give 8.5 g. crude material which is recrystallized from ethanol to yield 5.25 g. of 9-chloro-1,2,3,4,11,11a-hexahydro - 2,8-dimethylpyrazino [1,2-b] [1,2,4] benzothiadiazine 6,6-dioxide, M.P. 192–194° C.

Calcd. for $C_{12}H_{16}ClN_3O_2S$: C, 47.70; H, 5.34; Cl, 11.77; N, 13.93; S, 10.65. Found: C, 47.95; H, 5.60; Cl, 11.90; N, 13.77; S, 10.30.

The above prepared 9-chloro-1,2,3,4,11,11a-hexahydro-2,8 - dimethylpyrazino[1,2-b][1,2,4]benzothiadiazine 6,6-dioxide (2.5 g.) is dissolved in warm ethanol and acidified with ethanolic hydrochloric acid. Upon cooling the precipitated solid is collected (2.7 g.) and recrystallized from ethanol to yield 9-chloro-1,2,3,4-11,11a-hexahydro-2,8 - dimethylpyrazino[1,2-b][1,2,4]benzothiadiazine 6,6-dioxide hydrochloride, M.P. 262–263° C.

Calcd. for $C_{12}H_{16}ClN_3O_2S \cdot HCl$: C, 42.65; H, 5.07; Cl, 20.95; N, 12.42; S, 9.47. Found: C, 42.48; H, 4.95; Cl, 20.40; N, 12.16; S, 8.90.

Similarly, 9-bromo-1,2,3,4,11,11a-hexahydro-8-methyl-2-propylpyrazino[1,2-b][1,2,4]benzothiadiazine 6,6 - dioxide and 9,10-dichloro-1,2,3,4,11,11a-hexahydro-8-methylpyrazino[1,2-b][1,2,4]benzothiadiazine 6,6-dioxide hydrochloride are obtained.

Example II 6-amino - 4-chloro-N-(2-[(2-diethoxyethyl)amino]ethyl)-m-toluenesulfonamide (10 g.) is dissolved in an aqueous ethanol solution, the mixture acidified with hydrochloric acid and heated on a steam bath for two hours. Thereafter, the reaction mixture is cooled, extracted with benzene, treated with Darco and neutralized with a sodium bicarbonate solution. The solid which precipitates is collected (2.5 g.) and recrystallized from ethanol to yield 9-chloro - 1,2,3,4,11,11a-hexahydro-8-methylpyrazino[1,2-b][1,2,4]benzothiadiazine 6,6 - dioxide, M.P. 228–230° C.

Calcd. for $C_{11}H_{14}ClN_3O_2S$: C, 45.90; H, 4.89; Cl, 12.32; N, 14.57; S, 11.13. Found: C, 45.90; H, 4.53; Cl, 12.70; N, 14.33; S, 10.90

In the same manner, 6-amino-N-(2-[(2-dimethoxyethyl)amino]ethyl)-m-toluenesulfonamide is treated with sulfuric acid to produce 1,2,3,4,11,11a-hexahydro-8-methylpyrazino [1,2-b][1,2,4]benzothiadiazine 6,6-dioxide.

Example III 3-chloro - N - (2-[(2-diethoxyethyl)methylamino]ethyl)-6-N-methylamino-p-toluenesulfonamide (10 g.) is dissolved in an aqueous ethanol solution, the mixture acidified with hydrochloric acid and heated on a steam bath for two hours. The reaction mixture is then cooled, extracted with toluene, treated with Darco, and neutralized with sodium hydroxide. The resulting precipitate is collected and recrystallized from methanol to yield 8-chloro-1,2,3,4,11,11a - hexahydro - 2,9,11-trimethylpyrazino[1,2-b][1,2,4]benzothiadiazine 6,6-dioxide.

Similarly, by reacting 3-bromo-6-N-ethylamino-N-(2-[dipropoxyethyl)ethylamino]ethyl) - p - toluenesulfonamide with hydrobromic acid, there is obtained 8-bromo-2,11-diethyl-1,2,3,4,11,11a - hexahydro - 9 - methylpyrazino[1,2-b][1,2,4]benzothiadiazine 6,6-dioxide.

Example IV 6-anilino - 4 - chloro - N - (2-[(2-diethoxyethyl) phenylamino]ethyl)-benzenesulfonamide is suspended in water and acidified with hydrochloric acid. Thereafter, the reaction mixture is heated to 50° C. for five hours, cooled, extracted with benzene, treated with activated charcoal, and then neutralized with a potassium hydroxide solution. The resulting precipitate is separated and then recrystallized from methanol to yield 9 - chloro - 1,2,3,4,11,11a-hexahydro - 2,11 - diphenylpyrazino[1,2-b][1,2,4]benzothiadiazine 6,6-dioxide.

In a similar manner, 11-(p-chlorophenyl)-1,2,3,4,11, 11a-hexahydro - 2 - (p-tolyl)pyrazino[1,2-b] [1,2,4]-benzothiadiazine 6,6-dioxide is obtained.

Example V

Repeating the procedure as described in Examples I to IV to react the following N-(2-[(2-dialkoxyethyl)amino]ethyl)-benzenesulfonamides with a mineral acid, the hereinafter listed products are obtained:

| Starting Material | Product |
| --- | --- |
| 6-amino-N-(2-[(2-dimethoxyethyl)-p-chlorophenylamino]ethyl)-4-methyl-m-toluene-sulfonamide. | 2-(p-chlorophenyl)-1,2,3,4,11,11a-hexahydro-8,9-dimethylpyrazino[1,2-b][1,2,4]benzothiadiazine 6,6-dioxide. |
| 6-amino-5-ethyl-N-(2-[(2-dibutoxyethyl)-propylamino]ethyl)-m-toluenesulfonamide. | 10-ethyl-1,2,3,4,11,11a-hexahydro-8-methyl-2-propylpyrazino[1,2-b][1,2,4]benzothiadiazine 6,6-dioxide. |
| 6-amino-N-(2-[(2-diethoxyethyl)-m-ethylphenylamino]ethyl)-4-iodobenzenesulfonamide. | 2-(m-ethylphenyl)-1,2,3,4,11,11a-hexahydro-9-iodopyrazino[1,2-b][1,2,4]benzothiadiazine 6,6-dioxide. |
| N-(2-[(2-diethoxyethyl)methylamino]ethyl)-6-(p-ethyl-anilino)benzenesulfonamide. | 11-(p-ethylphenyl)-1,2,3,4,11,11a-hexahydro-2-methylpyrazino[1,2-b][1,2,4]benzothiadiazine 6,6-dioxide. |
| 6-(p-bromoanilino)-N-(2-[(2-dimethoxyethyl)-p-bromophenylamino]ethyl)benzenesulfonamide. | 2,11-di(p-bromophenyl)-1,2,3,4,11,11a-hexahydropyrazino[1,2-b][1,2,4]benzothiadiazine 6,6-dioxide. |
| 6-amino-N-(2-[(2-diethoxyethyl)-p-iodophenylamino]ethyl)-3-propylbenzene-sulfonamide. | 1,2,3,4,11,11a-hexahydro-2-(p-iodophenyl)-8-propylpyrazino[1,2-b][1,2,4]benzothiadiazine 6,6-dioxide. |

Example VI

6 - N - butylamino - N - (2-[(2-diethoxyethyl)methylamino]ethyl)-3-fluoro - p - toluenesulfonamide is suspended in water and acidified with hydrochloric acid. Thereafter, the reaction mixture is heated to 85° C. for one-half hour, cooled, extracted with chloroform, treated with activated charcoal, and then neutralized with a sodium bicarbonate solution. The resulting precipitate is separated by filtration and then recrystallized from butanol to yield 2-butyl - 8 - fluoro - 1,2,3,4,11,11a - hexahydro-9-methylpyrazino[1,2-b][1,2,4]benzothiadiazine 6,6-dioxide.

In a similar manner, 1,2,3,4,11,11a - hexahydro-2-methyl - 11 - (p-tolyl)pyrazino[1,2-b][1,2,4]benzothiadiazine 6,6-dioxide and 2-(p-bromophenyl) - 1,2,3,4,11,11a-hexahydropyrazino[1,2-b][1,2,4]benzothiadiazine 6,6-dioxide are produced.

Example VII

9 - chloro - 1,2,3,4,11,11a - hexahydro-8-methylpyrazino[1,2-b][1,2,4]benzothiadiazine 6,6-dioxide (0.20 m.) as prepared in Example II, is dissolved in ethanol and admixed with benzylbromide (0.40 m.) and triethylamine (0.40 m.). The reaction mixture is then heated to 80° C. for one hour, cooled and diluted with water. The resulting precipitate is separated by filtration and recrystallized from ethanol to yield 2,11 - dibenzyl - 9 - chloro-1,2,3,4,11,11a - hexahydro - 8 - methylpyrazino[1,2-b][1,2,4]benzothiadiazine 6,6-dioxide.

Similarly, 2,11-diphenpropyl - 9 - chloro - 1,2,3,4,11,11a - hexahydro - 8 - methylpyrazino[1,2-b][1,2,4]benzothiadiazine 6,6-dioxide is produced.

Example VIII

9 - chloro - 1,2,3,4,11,11a - hexahydro - 8 - methylpyrazino[1,2-b][1,2,4]benzothiadiazine (0.20 m.), as prepared in Example II, is dissolved in a 10% sodium hydroxide solution and admixed with 2-diethylaminoethyl chloride (0.40 m.). The reaction mixture is heated to 75° C. for one-half hour, cooled and evaporated to dryness. The residue is recrystallized from methanol to yield 9-chloro-2,11-bis-(2-diethylaminoethyl) - 1,2,3,4,11,11a - hexahydro - 8- methylpyrazino[1,2-b][1,2,4]benzothiadiazine 6,6-dioxide.

In a similar manner, 9,10 - dichloro-2,11-bis-(3-dimethylaminopropyl) - 1,2,3,4,11,11a-hexahydro-8-methylpyrazino[1,2-b][1,2,4]benzothiadiazine 6,6-dioxide is obtained.

Example IX 6-amino-4 - chloro-N - (2-[(2 - diethoxyethyl)methylamino]ethyl) - 3 - sulfamoylbenzenesulfonamide is suspended in water, acidified with hydrochloric acid, then heated on a steam bath for one and a half hours and cooled. The reaction mixture is then extracted with benzene, treated with Darco and then neutralized with a sodium bicarbonate solution. The resulting solid is collected and dried at room temperature and then recrystallized from ethanol to yield 9-chloro-1,2,3,4,11,11a-hexahydro - 2 - methyl - 8 - sulfamoylpyrazino[1,2-b][1,2,4]benzothiazine 6,6-dioxide.

Example X 1,2,3,4,11,11a-hexahydro - 8 - methylpyrazino[1,2-b][1,2,4]benzothiadiazine 6,6-dioxide is dissolved in warm ethanol and acidified with ethanolic hydrobromic acid. Upon cooling the precipitated solid is collected and recrystallized from ethanol to yield 1,2,3,4,11,11a-hexahydro - 8 - methylpyrazino[1,2-b][1,2,4]benzothiadiazine 6,6-dioxide hydrobromide.

Other acid addition salts of the new 1,2,3,4,11,11a-hexahydropyrazino[1,2-b][1,2,4]benzothiadiazine 6,6-dioxides of the present invention described in the above examples are prepared by the same procedure employing hydrochloric acid, hydrobromic acid, nitric acid, sulfuric acid, phosphoric acid, acetic acid, lactic acid, citric acid, tartaric and gluconic acid.

What is claimed is:

1. A process for the production of a compound of the formula:

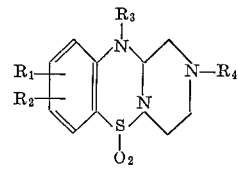

wherein $R_1$ and $R_2$ are both selected from the group consisting of hydrogen sulfamoyl, halogen, and lower alkyl; $R_3$ and $R_4$ are both selected from the group consisting of hydrogen, lower alkyl, phenyl, lower alkylphenyl and halophenyl; which comprises reacting a compound selected from the group consisting of those having the formula:

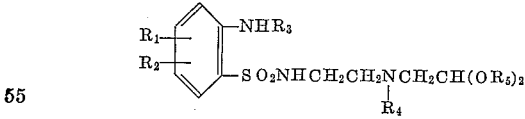

wherein $R_1$, $R_2$, $R_3$ and $R_4$ are defined as above and $R_5$ is lower alkyl; with a mineral acid, in a reaction-inert solvent at a temperature that is in the range from about 50° C. to about 100° C. for a period of about one-half to about five hours.

2. A process as claimed in claim 1 wherein the reaction is conducted at the reflux temperature of the reaction mixture for one and a half hours.

References Cited by the Examiner
UNITED STATES PATENTS 3,257,395  6/1966  Griot _____ 260—243

NICHOLAS S. RIZZO, *Primary Examiner.*